United States Patent [19]
Kumpera et al.

[11] Patent Number: 6,123,856
[45] Date of Patent: Sep. 26, 2000

[54] DEWATERING OF SLUDGES

[75] Inventors: Victor Kumpera, Crofton, Canada; Stephen Robert Tremont, Chesapeake, Va.

[73] Assignee: Ciba Specialty Chemicals Water Treatments Limited, Bradford, United Kingdom

[21] Appl. No.: 09/221,725

[22] Filed: Dec. 29, 1998

[30]    Foreign Application Priority Data

Jan. 9, 1998  [GB]  United Kingdom ............... 9800497

[51] Int. Cl.⁷ .................................................. C02F 11/14
[52] U.S. Cl. ..................... 210/727; 162/189; 210/728; 210/729; 210/732; 210/928; 210/919
[58] Field of Search ............................. 162/189; 210/725, 210/727, 728, 732, 729, 928, 919

[56]    References Cited

U.S. PATENT DOCUMENTS

| | | | |
|---|---|---|---|
| 3,850,799 | 11/1974 | Ludwig | 210/47 |
| 4,479,879 | 10/1984 | Hashimoto et al. | 210/727 |
| 5,178,770 | 1/1993 | Chung | 210/705 |
| 5,230,808 | 7/1993 | Chung et al. | 210/928 |
| 5,354,479 | 10/1994 | Wretborn et al. | 210/728 |
| 5,437,791 | 8/1995 | Göransson et al. | 210/712 |
| 5,538,596 | 7/1996 | Satterfield et al. | 162/164.5 |
| 5,601,725 | 2/1997 | Chung et al. | 210/727 |
| 5,681,480 | 10/1997 | Langley et al. | 210/727 |

FOREIGN PATENT DOCUMENTS

| | | |
|---|---|---|
| 1004782 | 2/1977 | Canada . |
| 0017353 | 4/1992 | European Pat. Off. . |
| 0235893 | 3/1998 | European Pat. Off. . |
| 0641293 | 10/1998 | European Pat. Off. . |
| 8604975 | 5/1988 | Sweden . |
| 95/21296 | 8/1995 | WIPO . |

OTHER PUBLICATIONS

Derwent Abstr. 88–210940 for SE 8604975–6.
Derwent Abstr. 99–082212.

*Primary Examiner*—Peter A. Hruskoci
*Attorney, Agent, or Firm*—David R. Crichton

[57]    ABSTRACT

A sludge, preferably derived at least in part from a paper mill, pulp mill or deinking plant, and which contains at least secondary sludge or primary sludge comprising deinking waste, recycled paper waste or mechanical pulping waste, is flocculated by being mixed with a phenolic material and a polyalkylene oxide and is then subjected to dewatering.

17 Claims, No Drawings

DEWATERING OF SLUDGES

BACKGROUND OF THE INVENTION

This invention relates to promoting the dewatering of sludges by the addition of a flocculating system to the sludge prior to the dewatering.

It is standard practice to flocculate a suspension of suspended solids by adding a polymeric flocculating agent to the suspension.

Different suspensions, and different dewatering processes, require different flocculating agents in order to obtain optimum results. Further, the optimum results vary according to the nature of the suspension being treated.

For instance, when the suspension has a relatively low solids content typically below 1% and usually below 0.5% and often below 0.2%, the optimum result is generally indicated by achieving the highest possible clarity of the supernatant or filtrate. When the suspension is a paper making cellulosic thin stock, the optimum result is generally indicated by optimum formation of the paper sheet, generally accompanied by optimum retention of suspended solids in the sheet. When the suspension is a waste sludge, optimum results are generally indicated by a good combination of dewatering rate, clarity and solids content of the dewatered product. For instance, it may be unacceptable to obtain a high solids cake in a very fast dewatering process if the resultant supernatant or filtrate clarity is poor, but it may be uneconomic to obtain a high solids cake and high clarity if the rate of dewatering is too slow.

The suspension solids in a low solids liquor which is to be clarified are usually different from those in a sludge. For instance a deinking was liquor may contain inks, fillers and deinking chemicals, and these are separated during clarification. A primary sludge which incorporates those separated solids is much more complex and also contains large amounts of different materials having very different properties, such as rejects from screening, cleaning and flotation deinking and other paper mill processes A polymer that may be useful when dewatering is by one process, may not be useful when it is by another. For instance different polymers may be required in processes where shear or pressure is applied to the flocculated material (for instance in a filter press or centrifuge) from the polymer where no such shear or pressure is applied (for instance in sedimentation processes).

Different polymers are also required according to differences in the suspended solids and in the dissolved phase. For instance suspensions of inorganic suspended solids are often best treated using anionic polymers while suspensions of organic suspended solids are often best treated using cationic polymers.

The molecular weight of the polymer also influences performance and although optimum flocculation in some processes requires the highest possible molecular weight, in other processes lower molecular weight gives better results. Even within any particular type of suspension, e.g. a cellulosic papermaking thin stock, different types of thin stocks require different types of polymers for optimum results.

There is therefore a very wide range of polymeric flocculants available for consideration for use in dewatering processes. They are selected from nonionic polymers, anionic polymers and a wide range of cationic polymers. Many are substantially water soluble polymers formed from ethylenically unsaturated acrylic or other monomer or monomer blends in various portions and made to low, medium, high or very high molecular weight. Amongst other polymers used for promoting dewatering there are polyamines, polyalkylene oxides, polyethylene imines, phenolic resins and dicyandiamide polymers.

There are numerous examples of processes in which water soluble acrylic polymers are used for flocculation, for instance EP-A-641,293 for sludges from paper-making waste water and EP-A-235,893 for paper making. Examples of processes using phenol formaldehyde and polyethylene oxide include U.S. Pat. No. 5,354,479 and CA 1,004,782 for treating paper-making waste waters, and WO95/21296 for paper making. An example of a process where it is proposed to use either a substantially non-ionic acrylic polymer or PEO for paper making is EP-A-017353.

The polymers usually used for promoting the dewatering of sludges are usually relatively high molecular weight, water soluble, cationic polymers such as polymers of 20 to 95% by weight acrylamide and 5 to 80% by weight of an acid addition or quaternary salt of a dialkylaminoalky (meth)-acrylate or acrylamide.

These polymeric acrylic flocculants give good results in many sludge dewatering processes. However there are some particularly difficult sludges where it is necessary to use unacceptably large amounts of these acrylic polymers to obtain satisfactory results, or where satisfactory results cannot economically be obtained using such polymers. The difficult sludges which suffer from this disadvantage tend to be those which include secondary sludges (especially when some or all of the sludges are derived from waste associated with paper making) and the sludges which include significant amounts of deinking wastes, recycling wastes and mechanical pulping wastes.

Primary sludges are sludges obtained by clarifying and sedimenting an aqueous liquor which may be, for instance, municipal sewage or effluent from a paper mill, pulp mill or deinking plant. The separation of the primary sludge from the initial liquor results in the formation of a supernatant or filtrate and this is then usually subjected to biological treatment to form what is usually referred to as a secondary sludge. It is usually much more difficult to dewater the secondary sludge than the primary sludge and so it is common practice to mix the primary and secondary sludges and then dewater the mixed sludge. This is true for municipal sewage treatment and also for industrial waste treatment, in particular the treatment of paper mill, pulp mill and deinking plant effluent.

As an indication of the increased difficulty of dewatering secondary sludge, it can be mentioned that a typical primary sludge usually requires 0.1 to 1.5 kg of an optimum acrylic polymeric flocculant per tonne of dry sludge solids whilst a primary sludge from a deinking, recycling or mechanical pulping plant may require 2 to 4 kg of optimum acrylic polymeric flocculant per tonne of dry sludge solids, and a secondary sludge usually requires 5 to 10 kg of optimum acrylic polymeric flocculant per tonne of dry sludge solids.

Sludges which contain secondary sludge, especially from paper making, pulping and deinking effluents, often contain a large proportion of organic residues which tend to interfere with the flocculation and dewatering mechanisms. As a result, the rate of dewatering and/or the clarity of the filtrate or supernatant and/or the dryness of the cake solids tend to be unsatisfactory even when relatively large amounts of polymeric flocculant are used on the sludge. The polymers which have been accepted as usually being the most efficient for such sludges are usually high molecular cationic acrylic polymers, sometimes in combination with low molecular weight cationic polymers such as polydimethyl diallyl ammonium chloride.

It would be desirable to be able to improve the dewatering of difficult sludges such as those so as to obtain an improved combination of dewatering rate and/or filtrate or supernatant clarity and/or cake solids, especially when the sludges originate (at least in part) from a paper mill, pulp mill or deinking plant.

SUMMARY OF THE INVENTION

According to the invention, a difficult sludge is dewatered by a process comprising flocculating the sludge by mixing a flocculating system into the sludge and separating water from the flocculated sludge, wherein the flocculating system comprises a phenolic material and a polyalkylene oxide flocculant.

Accordingly, contrary to the conventional belief that optimum results are obtained with a cationic acrylic polymer, in the invention a combination of a non-ionic polymer (polyalkylene oxide flocculant) and a non-ionic or anionic material (the phenolic material) is used.

The polyalkylene oxide is usually polyethylene oxide and the phenolic material can be a waste, such as a lignin-containing paper-making waste, or a phenolic resin.

As a result of the invention it is possible to obtain improved performance and, especially, it is possible to achieve improved dose effectiveness. Thus not only can a better combination of dewatering rate and/or clarity and/or cake solids often be obtained, but these or other good results can often be obtained using a lower dosage of polymer than is required when using the cationic acrylic polymer that was previously considered to be optimum.

DESCRIPTION OF THE PREFERRED EMBODIMENTS

The invention can be applied to sludges which are wholly municipal in origin but the invention is of particular value when applied to sludges derived from industrial effluent. In particular, some or all of the mixed sludge is preferably derived from effluents in a paper mill, pulp mill and/or deinking plant. For instance at least 10% and often at least 20 or 30% dry weight, and frequently 50 to 100% dry weight, of the sludge is preferably derived from such a mill or plant.

The sludge which is to be dewatered may be a difficult primary sludge, in which event at least 10% dry weight of the primary sludge is generally selected from deinking waste, recycled paper waste, and mechanical pulping waste. Thus at least 10% of the dry weight of the solids in the sludge may be provided by the waste from a deinking plant and/or from a recycled paper pulping plant and/or from a mechanical pulping plant, that is to say a plant where pulping is conducted by mechanical or semi-mechanical means. The sludges derived from waste from deinking plants, recycled paper plants and mechanical pulping plants are all regarded as dirty sludges which are difficult to dewater. Often the sludge contains at least 25% dry weight and frequently at least 50% of such wastes.

The advantages of the invention are particularly apparent when the sludge is a mixed sludge containing primary and secondary sludges. The secondary sludge may be present in a small amount (for instance at least 2%) when difficult primary sludge is mixed with it, but usually the amount of secondary sludge is at least 5 or 10% by weight of the mixed sludge (i.e. 5 or 10% based on dry solids).

The treatment of secondary sludge alone in the invention is technically possible but it is commercially usually desirable to include primary sludge with the secondary sludge and usually there is at least 5% primary sludge in the mixed sludge. Usually the dry weight ratio of primary:secondary sludge is not more than about 50:1, and usually not more than 20:1, and preferably it is not more than about 10:1, or in many process, not more than 5:1. Usually it is not less than about 0.1:1, preferably not less than about 0.2:1 and generally not less than about 0.5:1. Amounts in the range about 5:1 to 1:1 are often suitable.

The invention is of particular value when applied to mixed sludges in which at least 10% and preferably at least 20 or 30% by weight of the dry solids are derived from deinking waste, recycled paper waste and mechanical pulping waste.

The fibre content of the primary sludge appears to contribute particularly beneficially to the process and so it is desirable that a significant proportion, for instance at least 10 or 20% by weight and often 50 to 100% by weight, of the primary sludge is derived from a paper mill and/or pulp mill and/or deinking plant.

Accordingly the invention is of particular applicability when conducted at a paper mill and/or pulp mill and/or deinking plant wholly or mainly for the treatment of the sludges generated in that mill or plant.

The dewatering process which is promoted in the invention can be, for instance a thickening process, for instance when the mixed sludge has a relatively low solids content typically of 0.5 to 2% dry weight. Thickening can be by filtration or sedimentation. The dewatering can be by flotation.

Preferably the process results in cake formation, for instance as a result of subjecting the flocculated material to any of the conventional cake forming dewatering processes such as belt pressing, centrigugal dewatering or pressure filtration, for instance with a screw press or filter press. The resultant cake preferably has a dry matter content of at least 20% by weight, and usually at least 25% and preferably at least 28 or 30%, eg up to 35 or 40%. The sludge which is to be dewatered to provide the cake can have a solids content as low as 1 or 2% but the solids content is usually at least 3% by weight, eg up to 15% or 20%.

The flocculation system is mixed into the sludge in order to bring about flocculation. Although both components can be added simultaneously they are preferably added sequentially. Usually best results are achieved by mixing the phenolic material into the sludge followed by mixing the polyalkylene oxide into the sludge.

It is necessary for both materials to be in solution in order for them to cause the desired flocculation effect and it is generally best to introduce the materials into the sludge as preformed aqueous solutions. Usually they are supplied at the optimum dilution prior to being mixed with the sludge, but if desired either or both of them can be introduced into the sludge in a more concentrated form, together with dilution water to facilitate distribution throughout the sludge.

When adding the phenolic material first, it is often convenient to observe the character of the sludge after mixing the phenolic material into it. If the sludge appears to acquire a rather slimy character at this stage, it may be an indication that the amount of secondary sludge in the blend is higher than is appropriate for good results with that phenolic material. Under these circumstances it is desirable to modify the mixed sludge by reducing the proportion of secondary sludge, or to test the effect of different phenolic materials to find one that does not give this slimy character. For instance changing the phenolic material to a resin having a rather high molecular weight may solve the problem without having to change the proportions of primary and secondary sludges.

It appears to be desirable for the phenolic material to react with components of, especially, the secondary sludge, before the addition of the polyalkylene oxide. In particular, it seems that the phenolic material is reacting with proteinaceous material in the sludge and that the polyalkylene oxide causes flocculation by interaction with this complex or reaction product.

Irrespective of whether or not this mechanism is right, we find that it is possible to obtain good results using phenolic waste materials, i.e., materials which are by-products of an industrial process and which have a phenolic content. This phenolic content can be monomeric or polymeric. By referring to "phenolic" we intend to refer not only to phenol itself but also to substituted phenols and naphthols, either in monomeric, oligomeric or polymeric form.

Preferred waste liquors which can be added to the sludge in order to introduce the phenolic material into the sludge include phenolic-containing waste liquor recovered from a paper mill, pulp mill or deinking plant. Thus a relatively low solids waste liquor from such a mill or plant can be used to supply the required phenolic material. Such waste liquors are preferably by-products of wood extraction processes, such as Kraft Black Liquor, Neutral Sulphite Semi-Chemical Liquor and other sulphite liquors, as well as the wash liquors obtained from washing pulp after cooking, or filtrate obtained through extraction processes conducted on groundwood, chemothermo mechanical pulp, thermo mechanical pulp, bleached chemothermo mechanical pulp, unbleached pulp or, indeed, any pulp or paper mill stream which contains lignins, wood resins and similar phenolic components in a useful concentration. Other waste liquors which contain lignin and other phenolic components and which can be used in the invention include waste liquors from saw mills and waste liquors from coal processing facilities, for instance coal washeries. The preferred waste products are waste pulping liquors, especially Kraft Black Liquor and Neutral Sulphite Semi Chemical and other sulphite liquors.

Instead of relying solely on waste phenolic material, it is often preferred to utilise phenolic resin, in particular deliberately synthesised or extracted phenolic resin, i.e., material which is commercially supplied as phenolic resin. Best results, especially from a cost effectiveness point of view, are often obtained by using a combination of phenolic waste liquor and extracted or synthesized phenolic resin.

The phenolic resin can be any substantially water soluble phenolic resin and is usually a phenolic formaldehyde resin. It may contain sulphone and/or sulphonic acid groups. Thus although conventional soluble phenol formaldehyde resins can be used, it is particularly preferred to use phenolic resins which contain sulphone and sulphonic acid groups, in particular the resins described in our application WO95/21296 and U.S. Pat. No. 5,538,596 of Satterfield et al, both of which are herein incorporated by reference.

The polyalkylene oxide can be any polyalkylene oxide which has the potential for causing useful flocculation. The alkylene groups can be propylene but are usually ethylene, and best results are generally obtained when the polyalkylene oxide is polyethylene oxide. The molecular weight is usually above 1 million but below 25 million, for instance 3 to 10 million.

The optimum amounts of phenolic material and polyalkylene oxide will best be found by routine experimentation on the particular sludge mixture which is to be treated. Usually the dry weight ratio phenolic material:polyalkylene oxide is in the range about 25:1 to 1:10, preferably about 15:1 to 1:3 and often in the range about 5:1 to 1:2.

The dry weight of polyalkylene oxide which is added to the sludge is generally in the range about 0.05 to 10 kg/t, often about 0.1 to 3 kg/t and usually around 0.2 to 1.5 kg/t. In particular, the amount of polyalkylene oxide is usually less (and often less than two thirds or less than half) the amount of conventional cationic polymer that would normally be used for optimum results with that particular sludge. For instance if that particular sludge mixture would normally be flocculated using 3 kg/t of cationic acrylic polymer, in the invention we find that the amount of polyethylene oxide would normally be below 1.5 and usually below 1 kg/t.

Indeed, the combined weight of polyalkylene oxide and phenolic material is generally less than the amount of conventional cationic polymer which is optimum. Typically the amount or phenolic material (dry weight) is 0.3 to 5 kg/t, often 0.5 to 3 kg/t. With many sludges amounts in the range 0.5 to 1.5 kg/t of phenolic resin (or equivalent amounts of waste liquor containing phenolic material) are often suitable.

The pH of the sludge may, if required, be adjusted prior to the addition of the flocculating system, so as to optimise the effect of the flocculating system. If necessary, the temperature of the sludge or of the aqueous solution or solutions of phenolic material and polyalkylene oxide flocculant may be adjusted so as to give optimum results. Either the sludge or the flocculating system can be above ambient temperature. Heating may be applied to achieve this or hot liquor containing phenolic material, for instance pulping liquor, may be used without deliberate cooling.

Although the preferred processes of the invention rely on the flocculating system of phenolic material and polyalkylene oxide flocculant as the essential, and indeed generally the only, flocculating components used in the process, it is possible to add other synthetic polymers to promote the flocculation. For instance the effect of the polyalkylene oxide flocculant can be enhanced or supplemented by the addition of non-ionic polyacrylamide with, before or after the polyalkylene oxide, or some other synthetic polymeric flocculant (non-ionic, anionic or cationic) can be added. Such materials to be added with, just before or after the polyalkylene oxide are usually high molecular weight, for instance intrinsic viscosity above 4 dl/g or molecular weight above 2 million. Intrinsic viscosity is measured by a suspended level viscometer in 1N sodium chloride solution buffered to pH 7 at 20° C.

It can be desirable to add a cationic organic or inorganic material to the sludge before adding the phenolic material and the polyalkylene oxide flocculant. This cationic organic or inorganic material can be a multivalent metal coagulant such as a ferric or aluminium coagulant but is preferably a water soluble cationic polymeric coagulant. This can be a naturally occurring cationic polymer but generally it is a synthetic cationic polymer having intrinsic viscosity below 3 dl/g. Usually it has relatively high charge density, for instance at least 4meq/g, thus indicating that, generally, at least 50%, and usually at least 70%, by weight of the monomeric material used for forming the polymer is cationic. The IV of the coagulant cationic polymers is usually below 2 dl/g, the molecular weight typically being 20,000 to 2 million, usually 100,000 to 500,000 or sometimes up to 1 million.

Suitable coagulant polymers include polycyandiamide formaldehyde polymers, homopolymers and copolymers (generally with acrylamide) of diallyl dimethyl ammonium chloride or dialkylaminoalkyl (meth)-acrylate or -acrylamide polymers (usually as acid addition or quaternary ammonium salt), dimethylamino epichlorohydrin polymers and other polyamines, or polyethylene imine.

Instead of using a low molecular weight high charge density polymer, it can sometimes be useful to include a higher molecular weight cationic acrylic polymer either before the defined flocculating system of phenolic material and polyalkylene oxide or with it or, more usually, after it. These higher molecular weight cationic polymers can conventionally be copolymers of acrylamide with dialkylaminoalkyl (meth)-acrylate or -acrylamide (usually as methyl chloride or dimethyl sulphate or other quaternary salts) or diallyl dimethyl ammonium chloride. Typically they have intrinsic viscosity from 4 to 20, often 6 to 12 dl/g. The molecular weight typically is in the range 500,000 to 15 million, often around 2 to 10 million.

The following are examples of the invention.

EXAMPLE 1

The waste effluent liquors from a paper mill were collected and subjected to sedimentation to form a primary sludge having a solids content of 2.5%. These and other liquors at the mill were collected and subjected to biological digestion and thereby produced a secondary sludge having a solids content of 1.0%.

Two parts dry weight of the primary sludge was blended with one part dry weight of the secondary sludge. The resultant mixed sludge was subjected to laboratory tests with various doses of flocculating systems and free drainage values were determined to record the volume drained from 500 ml of the sludge sample and 100 ml or potable water (used to dilute chemical additives) in 30 seconds and 60 seconds (simulating initial free drainage) and under pressure in 120 seconds (simulating the ability to provide a dry cake). In each instance, the highest value indicates the best performance. The filtrate clarity wedge value was determined, and again the highest value indicates the best (clearest) filtrate.

The following table shows the results for various doses of a single flocculant consisting of a copolymer of 90% by weight acrylamide and 10% by weight dimethylaminoethyl methacrylate methyl chloride quaternised, IV 14 dl/g (Polymer I) and the results are also given for various combinations of polyethylene oxide, 7,000,000 molecular weight (PEO) and henolsulphone-formaldehyde resin (PSR). Rates of the component addition were used per tonne of dry sludge i.e., 0.1% addition equals 1 Kg component/tonne dry sludge.

EXAMPLE 2

A process broadly as described in Example 1 was repeated except that pulp mill sludges which were used were blended at a ratio of one part dry weight of primary sludge of ten parts dry weight of secondary sludge. The resultant mixed sludge was subjected to laboratory test with various flocculating systems to determine drainage and filtrate clarity.

The following table shows the results for the various doses of flocculants consisting of a copolymer of 90% by weight acrylamide and 10% by weight dimethylaminoethyl methacrylate methyl chloride quaternised, IV 14 dl/g (Polymer I) and the results are also given for various combinations of polyethylene oxide, 7,000,000 molecular weight (PEO) phenolsulphone-formaldehyde resin (PSR), and phenol-formaldehyde resin (PFR). Rates of component addition were based per tonne of dry sludge i.e. 0.1% addition equals 1 Kg component/tonne dry sludge.

TABLE 1

| Test | First Addition | Second Addition | Volume Drained ml after 30 secs | Volume Drained ml after 60 secs | Volume Drained ml after 120 secs | Clarity Wedge points |
|---|---|---|---|---|---|---|
| A | nil | nil | 150 | 190 | 310 | 1 |
| B | nil | 0.3% Polymer I | 220 | 275 | 450 | 6 |
| C | nil | 0.5% Polymer I | 250 | 310 | 460 | 9 |
| D | nil | 0.05% PEO | 210 | 275 | 445 | 12 |
| E | 0.036% PSR | 0.025% PEO | 265 | 310 | 470 | 14 |
| F | 0.036% PSR | 0.05% PEO | 365 | 375 | 470 | 46 |
| G | 0.072% PSR | 0.05% PEO | 390 | 420 | 500 | 46 |

From the above, it can be seen that the free drainage and pressed drainage results were considerably improved, and the clarity considerably better, with the polyethylene oxide

TABLE 2

| Test | First Addition | Second Addition | Volume Drained ml after 30 secs | Volume Drained ml after 60 secs | Volume Drained ml after 120 secs | Clarity Wedge Points |
|---|---|---|---|---|---|---|
| A | nil | nil | 400 | 410 | 450 | 0 |
| B | nil | 0.5% Polymer I | 380 | 400 | 480 | 2 |
| C | nil | 0.7% Polymer I | 390 | 400 | 440 | 5 |
| D | 0.1% PSR | 0.05% PEO | 390 | 410 | 450 | 22 |
| E | 0.15% PSR | 0.1% PEO | 390 | 445 | 485 | 14 |
| F | 0.15% PFR | 0.1% PEO | 400 | 410 | 470 | 7 |
| G | 0.20% PFR | 0.15% PEO | 420 | 430 | 490 | 14 | and phenolsulphone-formaldehyde resin blend of the invention than the conventional acrylic polymer, even though the total dosage of the polyalkylene oxide phenolsulphone-formaldehyde polymer was considerably less than the otimum dosage for the acrylic polymer.

From the above it can be seen that the free drainage and pressed drainage results were about as good, and the clarity considerably better, with the polyethylene oxide phenolic blend of the invention than conventional acrylic polymer, even though the total dosage of the polyalkylene oxide phenolic blend was considerably less than the optimum dosage for the acrylic polymer.

EXAMPLE 3

A process broadly as described in Example 1 was repeated except that the paper mill sludges which were used were blended at a ratio of one tenths part dry weight of primary sludge to one part dry weight of secondary sludge. The resultant mixed sludge was subjected to laboratory tests with various flocculating systems to determine drainage and filtrate clarity.

The phenolic material was varied in these tests and, as shown in the table below, include a phenolsulphone resin (PSR) containing sulphonic acid groups as in WO95/21296 and a Kraft black liquor (KBL) from the wood pulping process as the source of part or all of the phenolic material. Rates of component were based per tonne of dry sludge i.e. 0.1% addition equals 1 Kg component/tonne dry sludge.

1.3% solids and subjected to laboratory tests with various flocculating systems to determine drainage and filtrate clarity using a turbidimeter rather than clarity wedge.

The following table shows the results for the various doses of flocculants consisting of a copolymer of 60% by weight acrylamide and 40% by weight dimethylaminoethyl methacrylate methyl chloride quaternised, IV 9 dl/g (Polymer II) and the results are also given for various combinations of polyethylene oxide, 7,000,000 molecular weight (PEO) and phenolsulphone-formaldehyde resin (PSR). Rates of component addition were based per tonne of dry sludge i.e. 0.1% addition equals 1 Kg component/tonne dry sludge.

TABLE 3

| Test | First Addition | Second Addition | Volume Drained ml after 30 secs | Volume Drained ml after 60 secs | Volume Drained ml after 120 secs | Clarity Wedge Points |
| --- | --- | --- | --- | --- | --- | --- |
| A | nil | nil | 50 | 75 | 130 | 0 |
| B | nil | 0.16% PEO | 80 | 105 | 290 | 0 |
| C | 0.1% PSR | 0.16% PEO | 155 | 220 | 460 | 42 |
| D | 0.2% PSR | 0.16% PEO | 275 | 345 | 510 | 46 |
| E | 0.5% KBL | 0.16% PEO | 125 | 170 | 400 | 34 |
| F | 1.0% KBL | 0.16% PEO | 210 | 270 | 500 | 46 |
| G | 0.1% PSR + 0.5% KBL | 0.16% PEO | 250 | 325 | 495 | 45 |
| H | 0.1% PSR + 1.0% KBL | 0.16% PEO | 305 | 370 | 510 | 48 |

From the above, it can be seen that the free drainage and pressed drainage results were considerably improved, and the clarity considerably better, with polyethylene oxide phenolic blend of the invention. The Kraft black liquor (KBL) could be used as the PEO co-factor by itself or in combination with the phenolsulphone-formaldehyde resin (PSR).

EXAMPLE 4

A process broadly as described in Example 1 was repeated except that paper mill sludges which were used were blended at a ratio of two parts dry weight of primary sludge to 7 parts primary deink sludge from a paper recycling operation. The resultant mixed sludge was determined to be

TABLE 4

| Test | First Addition | Second Addition | Volume Drained ml after 10 secs | Volume Drained ml after 20 secs | Volume Drained ml after 30 secs | Turbidity NTU |
| --- | --- | --- | --- | --- | --- | --- |
| A | nil | nil | 12 | 13 | 14 | 1000+ |
| B | nil | 0.3% Polymer I | 17 | 23 | 28 | 1000+ |
| C | nil | 0.4% Polymer II | 27 | 34 | 39 | 1000+ |
| D | nil | 0.5% Polymer II | 56 | 72 | 105 | 275 |
| E | 0.7% PSR | 0.1% PEO | 90 | 104 | 124 | 141 |
| F | 1.4% PSR | 0.2% PEO | 106 | 131 | 142 | <100 |

From the above, it can be seen that the free drainage results were considerably improved, and the clarity considerably better with polyethylene oxide and phenolsulphone-formaldehyde resin blend of the invention than the conventional acrylic polymer in mixed sludge primary, secondary and deink sludges.

What is claimed is:

1. A process for dewatering sludge of which at least 10% is selected from secondary sludges and primary sludges derived from deinking waste, recycled paper waste and mechanical pulping waste, comprising flocculating the sludge by mixing a flocculating system into the sludge and separating water from the flocculated sludge, wherein the flocculating system comprises a phenolic material and a polyalkylene oxide flocculant, wherein said phenolic material is selected from the group consisting of a synthesized phenolic resin, a extracted phenolic resin, a phenolic waste liquor, and mixtures thereof, and the dry weight ratio of phenolic material:polyalkylene oxide is 25:1 to 1:10.

2. A process according to claim 1 comprising clarifying and sedimenting effluent from a paper mill, pulp mill or deinking plant to form a primary sludge, mixing the said flocculating system into the primary sludge optionally after mixing secondary sludge into the primary sludge, and then dewatering the sludge to provide a cake having a solids content of at least 20% dry weight.

3. A process according to claim 2 in which the sludge has a solids content of at least 3% by weight.

4. A process according to claim 2 in which the dewatering is by a process selecting from belt pressing, centrifugal dewatering and filter pressing.

5. A process according to claim 2 in which dewatering is by filter pressing.

6. A process according to claim 1 in which the sludge is a mixed primary and secondary sludge in which the dry weight ratio of primary sludge to secondary sludge is 50:1 to 1:10.

7. A process according to claim 1 in which at least 50% by weight of the sludge is derived from a paper mill, pulp mill or deinking plant.

8. A process according to claim 1 in which the flocculating system is mixed into the sludge by mixing the phenolic material into the sludge and then mixing the polyalkylene oxide into the sludge.

9. A process according to claim 1 in which the phenolic material is added to the sludge as a phenolic waste liquor recovered from a paper mill or a pulp mill or a deinking plant or a coal washing plant.

10. A process according to claim 1 in which the phenolic material is added to the sludge as a waste liquor containing lignin.

11. A process according to claim 10 in which synthesised or extracted phenolic resin is added with the waste liquor.

12. A process according to claim 1 in which the phenolic material comprises synthesised or extracted phenolic resin.

13. A process according to claim 1 in which the phenolic material is a phenolic resin selected from phenolic formaldehyde resins, phenolic sulphone resins and phenolic resins containing sulphonic acid groups.

14. A process according to claim 1 in which the polyalkylene oxide is polyethylene oxide.

15. A process according to claim 1 in which the dry weight ratio phenolic material:polyalkylene oxide is 15:1 to 1:3.

16. A process according to claim 1 in which the amount of polyalkylene oxide flocculant which is mixed into the sludge is 0.05 to 10 Kg/t dry weight.

17. A process according to claim 1 in which a cationic coagulant is mixed with the sludge before the phenolic material and the polyalkylene oxide flocculant, wherein the cationic coagulant is selected from multivalent metal compounds and water soluble synthetic cationic polymers having intrinsic viscosity below 3 dl/g and a cationic charge density of at least 4 meq/g.

* * * * *